United States Patent
Kulish

[11] Patent Number: 5,996,275
[45] Date of Patent: Dec. 7, 1999

[54] SPECIES SPECIFIC TENSIONED HAIR TRIGGERED FIRING MECHANISM FOR ANIMAL TRAPS

[76] Inventor: John S. Kulish, 6604 W. Slope La., Oconto, Wis. 53150

[21] Appl. No.: 09/049,263

[22] Filed: Mar. 27, 1998

Related U.S. Application Data

[60] Provisional application No. 60/042,620, Apr. 3, 1997, provisional application No. 60/042,621, Apr. 3, 1997, provisional application No. 60/042,622, Apr. 3, 1997, provisional application No. 60/042,623, Apr. 3, 1997, and provisional application No. 60/053,708, Jul. 25, 1997.

[51] Int. Cl.[6] .................................................. A01M 23/24
[52] U.S. Cl. ......................................... 43/92; 43/88
[58] Field of Search .............................. 43/81, 81.5, 82, 43/83, 83.5, 88–97

[56] References Cited

U.S. PATENT DOCUMENTS

| | | | |
|---|---|---|---|
| 882,471 | 3/1908 | Larson | 43/92 |
| 1,049,634 | 1/1913 | Wolfe | 43/88 |
| 1,210,253 | 12/1916 | Ahlenius | 43/90 |
| 1,970,672 | 8/1934 | Prestenback | 43/96 |
| 2,125,595 | 8/1938 | Tenbrook | 43/81 |
| 2,228,808 | 1/1941 | Keppel | 43/94 |
| 2,459,580 | 1/1949 | Oleen | 43/85 |
| 2,496,393 | 2/1950 | Hayden | 43/82 |
| 2,564,811 | 8/1951 | Mau | 43/90 |
| 2,577,182 | 12/1951 | Clark | 43/90 |
| 2,701,428 | 2/1955 | Mau | 43/90 |
| 2,947,107 | 8/1960 | Lehn | 43/92 |
| 3,010,245 | 11/1961 | Conibear | 43/90 |
| 3,106,036 | 10/1963 | Lehn | 43/93 |
| 3,146,545 | 9/1964 | Frost | 43/90 |
| 3,335,517 | 8/1967 | Montgomery et al. | 43/92 |
| 3,421,251 | 1/1969 | Hofmeister | 43/92 |
| 3,426,471 | 2/1969 | Lehn | 43/92 |
| 3,747,259 | 7/1973 | Pellowski | 43/90 |
| 3,760,531 | 9/1973 | Conibear | 43/90 |
| 3,762,094 | 10/1973 | Conibear | 43/92 |
| 3,816,955 | 6/1974 | Conibear | 43/90 |
| 3,896,581 | 7/1975 | Gabry | 43/81 |
| 3,924,347 | 12/1975 | Conibear | 43/90 |
| 3,932,955 | 1/1976 | Desrosiers | 43/81 |
| 3,991,509 | 11/1976 | Frost | 43/90 |
| 4,037,350 | 7/1977 | Souza | 43/90 |
| 4,071,972 | 2/1978 | Conibear | 43/92 |
| 4,117,623 | 10/1978 | Conibear | 43/90 |
| 4,118,885 | 10/1978 | Carter | 43/97 |
| 4,128,961 | 12/1978 | Conibear | 43/88 |
| 4,129,958 | 12/1978 | Conibear | 43/92 |
| 4,129,959 | 12/1978 | Souza | 43/92 |
| 4,179,838 | 12/1979 | Harvey | 43/92 |
| 4,236,341 | 12/1980 | Torkko | 43/88 |
| 4,250,654 | 2/1981 | Souza et al. | 43/90 |
| 4,389,807 | 6/1983 | Novak | 43/96 |
| 4,406,082 | 9/1983 | Askins et al. | 43/92 |
| 4,411,091 | 10/1983 | Hedstrom et al. | 43/88 |
| 4,416,081 | 11/1983 | Askins | 43/90 |
| 4,499,685 | 2/1985 | Sibley | 43/96 |
| 4,720,934 | 1/1988 | Gompers | 43/89 |
| 5,579,602 | 12/1996 | Maw | 43/90 |

*Primary Examiner*—Michael J. Carone
*Assistant Examiner*—Darren W. Ark

[57] ABSTRACT

The present invention includes improvements to a rotating frame trap which makes the trap more species specific and provides a more humane kill of targeted species. These improvements include means of trigger tensioning, latch adjustment for hair trigger firing, a recessed trigger design, multiple latches, a square notch latch coupled with a flat jaw wire, a pan attachement on a trigger, and a one directional firing mechanism.

2 Claims, 10 Drawing Sheets

SPECIES SPECIFIC TENSIONED HAIR TRIGGERED FIRING MECHANISM FOR ANIMAL TRAPS

CROSS REFERENCES TO RELATED APPLICATIONS

Pursuant to 35 U.S.C. Par. 119 (e) (i) applicant claims priority of Provisional Patent Applications: 60/042,620 of Apr. 3, 1997: One Directional Latch And Release Mechanisms For An Animal Trap And An Improved Bucket 60/042,621 of Apr. 3, 1997: Adjustable Latch And Release For An Animal Trap 60/042,622 of Apr. 3, 1997: Actuator For An Animal Trap 60/042,623 of Apr. 3, 1997: Double Jaw Rotating Frame Trap With A Tensioned Trigger 60/053,708 of Jul. 25, 1997: Humane, Species Specific, Perimeter Weighted, Rotating Frame Trap With Emergency Release.

STATEMENT AS TO RIGHTS TO INVENTIONS MADE UNDER FEDERALLY-SPONSORED RESEARCH AND DEVELOPMENT

Not applicable.

BACKGROUND OF THE INVENTION

1. Field of the Invention

The present invention is a more species specific and humane animal trap. The animal trap is actuated by triggering mechanism improvements.

2. Description of Prior Art

In searching prior art, the following patents were discovered:

U.S. Pat. No. 1,210,253; Dec. 26, 1916; Ahlenus
U.S. Pat. No. 1,970,672; Aug. 21, 1934; Prestenback
U.S. Pat. No. 2,228,808; Jan. 14, 1941; Keppel
U.S. Pat. No. 2,459,580; Jan. 18, 1949; Oleen
U.S. Pat. No. 2,496,393; Feb. 7, 1950; Hayden
U.S. Pat. No. 2,564,811; Aug. 21, 1951; Mau
U.S. Pat. No. 2,577,182; Dec. 4, 1951; Clark
U.S. Pat. No. 2,701,428; Feb. 8, 1955; Mau
U.S. Pat. No. 2,947,107; Aug. 2, 1960; Lehn
U.S. Pat. No. 3,010,245; Nov. 28, 1961; Conibear
U.S. Pat. No. 3,106,036; Oct. 8, 1963; Lehn
U.S. Pat. No. 3,146,545; Sept. 1, 1964; Frost
U.S. Pat. No. 3,335,517; Aug. 15, 1967; Montgomery et al
U.S. Pat. No. 3,421,251; Jan. 14, 1969; Hofmeister
U.S. Pat. No. 3,426,471; Feb. 11, 1969; Lehn
U.S. Pat. No. 3,760,531; Sept. 25, 1973; Conibear
U.S. Pat. No. 3,762,094; Oct. 2, 1973; Conibear
U.S. Pat. No. 3,816,955; Jun. 18, 1974; Conibear
U.S. Pat. No. 3,924,347; Dec. 9, 1975; Conibear
U.S. Pat. No. 3,991,509; Nov. 16, 1976; Frost
U.S. Pat. No. 4,117,623; Oct. 3, 1978; Conibear
U.S. Pat. No. 4,128,961; Dec. 12, 1978 Conibear
U.S. Pat. No. 4,406,082; Sept. 27, 1983; Askins et al;
U.S. Pat. No. 4,250,654; Feb. 17, 1981; Souza et al;
U.S. Pat. No. 5,579,602; Dec. 3, 1996; Maw This seems to be a crowded art. The goals of the above inventors included more humane and reliable kills with lighter weight low cost mechanisms. Many an animal has suffered needlessly when caught in such a manner that death came slowly. Often an animal would twist off or bite off a leg to escape. Many a pet dog has been caught in a trap meant for a wild animal. Hunters have accidently stepped into traps and been injured, even suffering, on occasion, a cruel death from exposure while trapped.

In the prior art, as an animal goes through a trap known as a rotating frame trap, it hits a trigger wire which rotates a trigger bracket which elevates a latch which holds the trap jaws apart. As the latch elevates, the trap jaws are rotated by at least one spring, snapping shut on the animal. The intent is to humanely kill a specific specie of animal. Rotating frame traps are designed with a specific jaw spread and spring strength along with other factors for a specific size animal. Far too often, something smaller than the appropriate size is killed by the trap. Examples of unintended kills include rare otters, Atlantic salmon, baby alligators, squirrels, chipmunks, grouse, quail, and song birds. Even when the appropriate sized target specie is caught in a prior art rotating frame trap, it often is caught in a non-lethal area of the body because of excess free travel or slop in the trap's firing mechanism.

Also, in the prior art, the latching mechanisms tend to wear and become less reliable than the present invention.

Rotating frame traps are often used in buckets and in cavities in the ground in order to avoid non-target catches.

As will be seen in the subsequent description, the present invention includes improvements over the prior art that insure a more reliable, humane, and species specific kill than is currently available.

SUMMARY OF THE INVENTION

The present invention is a more durable, reliable, humane, and species specific animal trap as a result of actuating improvements comprising trigger tensioning, a trap latch adjustment for hair-trigger firing, a recessed trigger design, using two triggers instead of one, a flat spot on trap jaw to match a modified flat notch trap latch, a pan atachment for a trigger wire for step-on actuation, and a firing mechanism that actuates only in one direction.

DESCRIPTION OF THE PREFERRED EMBODIMENTS

Figure 1:
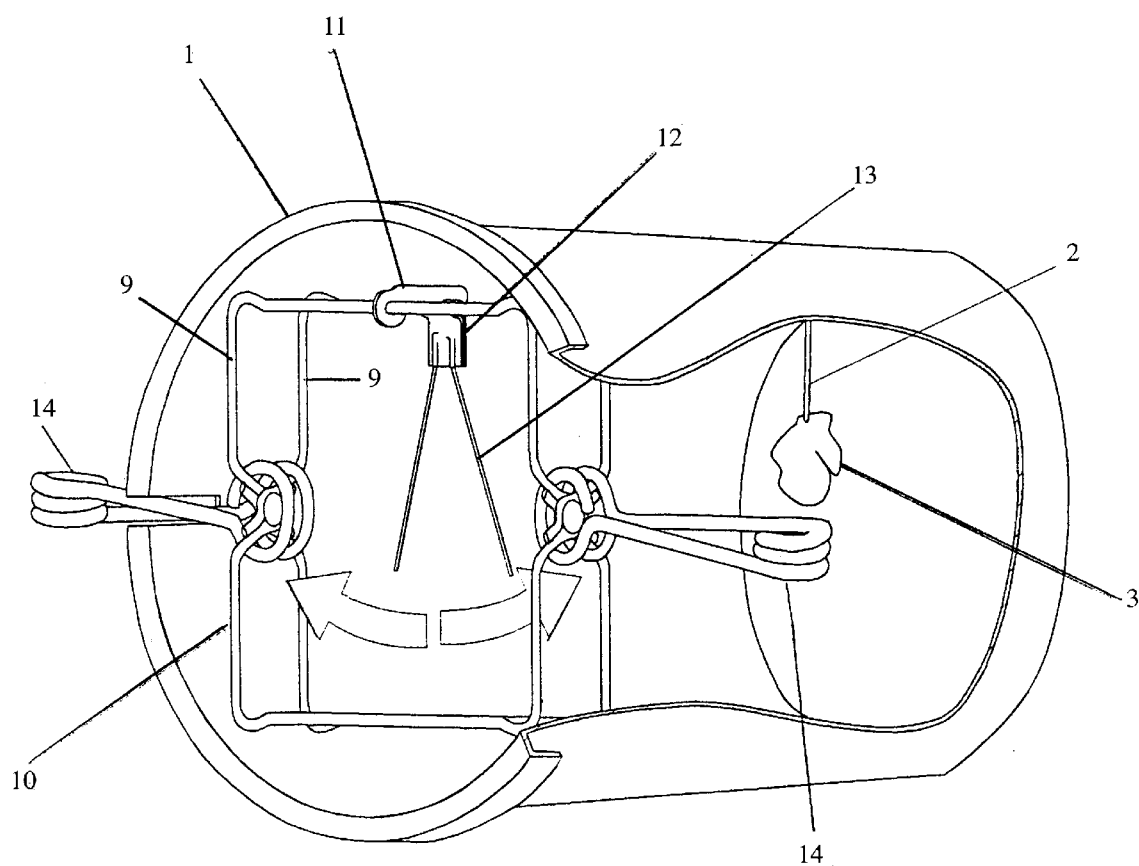
FIG. 1 shows a prior art rotating frame trap installed in a round bucket.

FIG. 1 shows a prior art installation of a rotating frame killer type animal trap 10, that is currently in wide use. When an animal sticks its snout into the bucket 1 to go for a bait 3, suspended from a bait hook 2, the animal displaces trigger wires 13 which rotates a trigger bracket 12, which releases a trap latch 11 which holds jaws 9 open. When the trap latch 11 is released, springs 14 force the jaws 9 of the trap 10 to snap shut, hopefully humanely killing the animal.

Figure 2A:
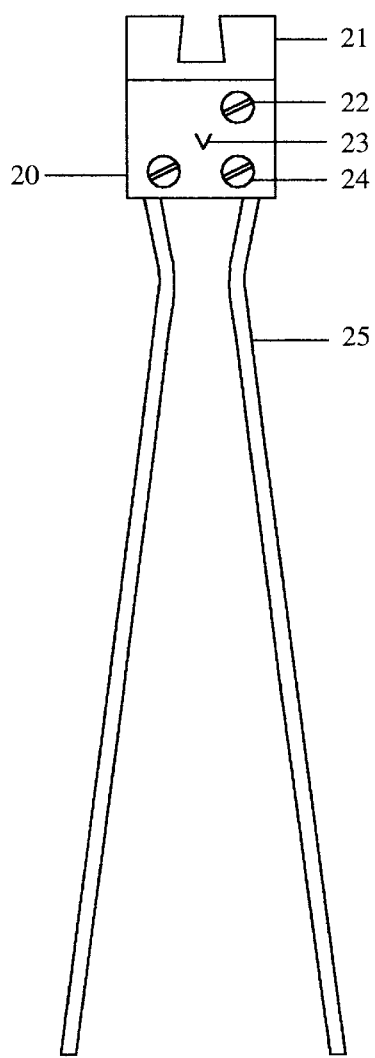
FIGS. 2A, 2B, 2C are views of a variable tension trigger firing mechanism.
Figure 2B:
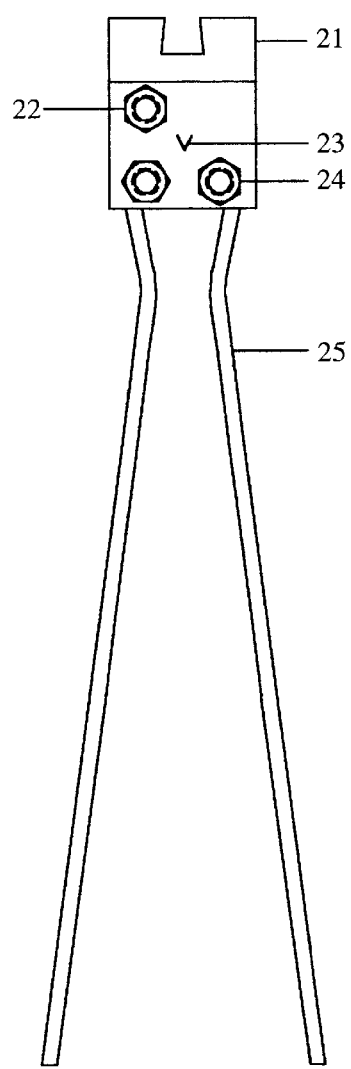
Figure 2C:
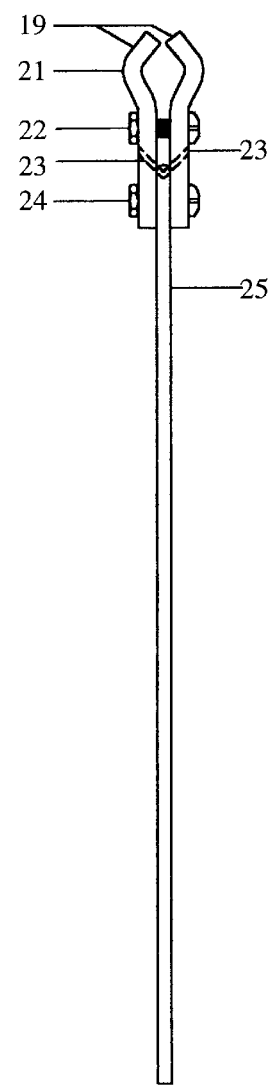
Figure 3:
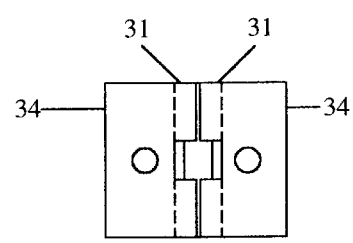
FIGS. 3, 3A, 3B, and 3C show an adjustable hair-trigger variable tension trigger firing mechanism.
Figure 3A:
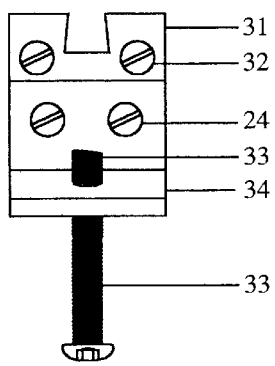
Figure 3B:
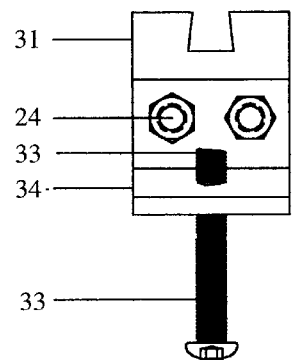
Figure 3C:
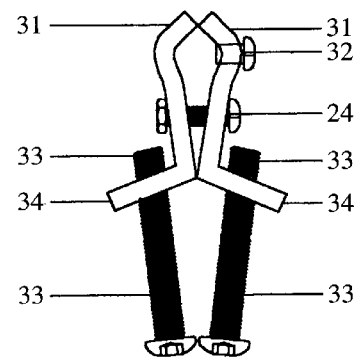
Figure 8:
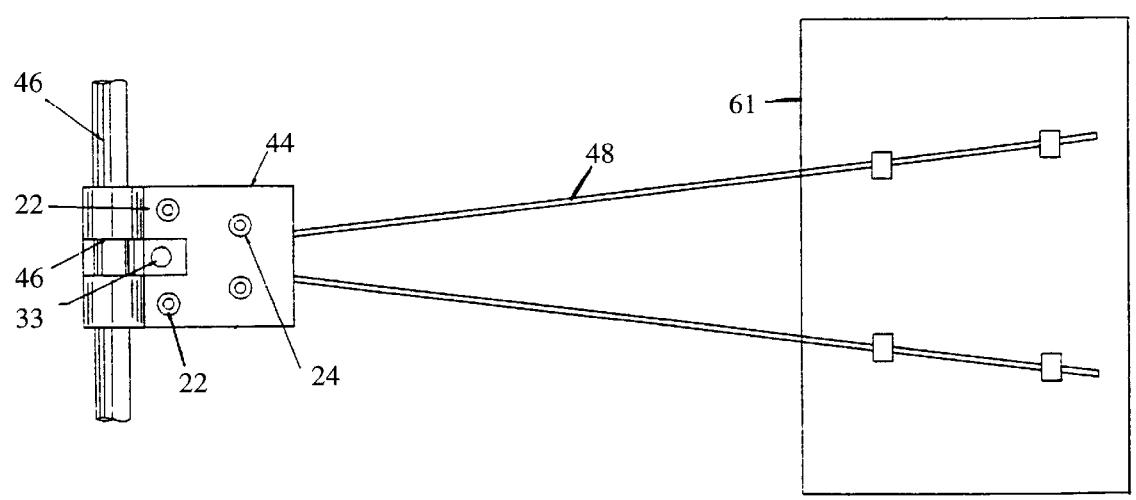
FIG. 8 is a top view of a pan trigger.

FIGS. 2A, 2B, and 2C are views of a variable tension trigger bracket 20 which includes bracket halves 19 which form a recess 21 which facilitates clamping of the bracket halves 19 around a jaw 9 of a trap 10 such as is shown in FIG. 1. Each of the bracket halves 19 has a V notch trigger stop 23. The variable tension trigger bracket 20 is shown including trigger wires 25. Bracket connecting screws with matching nuts 24 clamp the bracket halves 19 around the trigger wires 25. The variable tension trigger bracket 20 also includes a tension adjusting screw and nut 22 which permits adjusting the clamp pressure of the bracket halves 19 on the jaw 9 when installed on the jaw 9 of the trap 10 such as is shown in FIG. 1, or on a polygon trap jaw 46 as shown in FIG. 8. The V notch trigger stop 23 prevents sideways motion of the trigger wires 25 within the bracket 20 if the compression created by the tightening of the bracket connecting screw with matching nuts 24 is not sufficient. Variable tension is provided by the tension adjusting screw and nut 22. As the tension adjusting screw and nut 22 is tightened, it compresses the bracket halves 19 against a jaw of a trap such as is shown in FIG. 1. The amount of tension generated can be significant. Five students from the Univesity of Wisconsin spent five days conducting experiments with the preferred embodiment against all current existing designs of trigger firing mechanisms. The results showed a highly significant reduction of non-target otter kills at a 35:1 ratio in traps meant for beavers. Appendix A is a copy of the preliminary report. With the trigger wire 25 off to one side of the trap the non-target otters provided only a glancing blow so the variable tension trigger bracket 20 and did not fire the trap. If two variable tension trigger brackets 20 are used, both have to be actuated before the jaws 9 of a trap 10 are released. Therefore, the use of two variable tension trigger brackets 20 in opposite corners of a trap 10 would exclude even more non-target otters or Atlantic salmon, or baby alligators. If the shape of a trap 10 was rectangular, as opposed to square, even more space between two variable tension trigger brackets 20 would result allowing for more space for the otters to get through the trap safely. If only one of two variable tension trigger brackets 20 was actuated on a trap 10, the trap 10 would not spring because the second variable tension trigger bracket 20 would still hold the trap 10 open. Consequently, any species smaller than the targeted beaver would pass through safely. The larger targeted species, such as beaver, would fill the opening of the trap 10 with two of the variable tension trigger brackets 20, and as the beaver passed through, both of the variable tension trigger brackets 20 would be actuated, and the trap 10 would spring shut. A two trigger arrangement would also make prior art trigger brackets more species specific.

FIGS. 3, 3A, 3B, and 3C show the top, front, back, and side views, in that order, of a variable tension adjustable hair trigger firing bracket 30 which uses hair trigger adjusting screws 33, each through a ledge 34 of a bracket component 31, to raise a trap latch 11 (such as is shown in FIG. 1) to a position where a very small movement of the trigger wire 13 (Ref. FIG. 1), would result in lifting the latch 11 to a point where it releases the jaws 9. An extremely short trigger throw is safe to use because of the variable tension provided by the radial variable tension screws 32 which which have plastic coated tips to avoid jaw damage and to insure continued smooth operation, exerting pressure against the trap jaw 10. In the preferred embodiment of the present invention, the plastic tip would be nylon. However, as obvious to anyone skilled in the state of the art, other plastics would serve the same purpose. A shortened trigger throw results in a forward hit on a target species in a preferred area of the head, neck, or thorax as opposed to firing later after a fast moving target species is partially through the trap and striking with a non-lethal rear body or tail hit. This variable tension hair-trigger firing braket 30 works best in an open situation but works adequately in an enclosed situation, i.e. where the trap 10 is enclosed in a bucket 1 as shown in FIG. 1.

Figure 4:
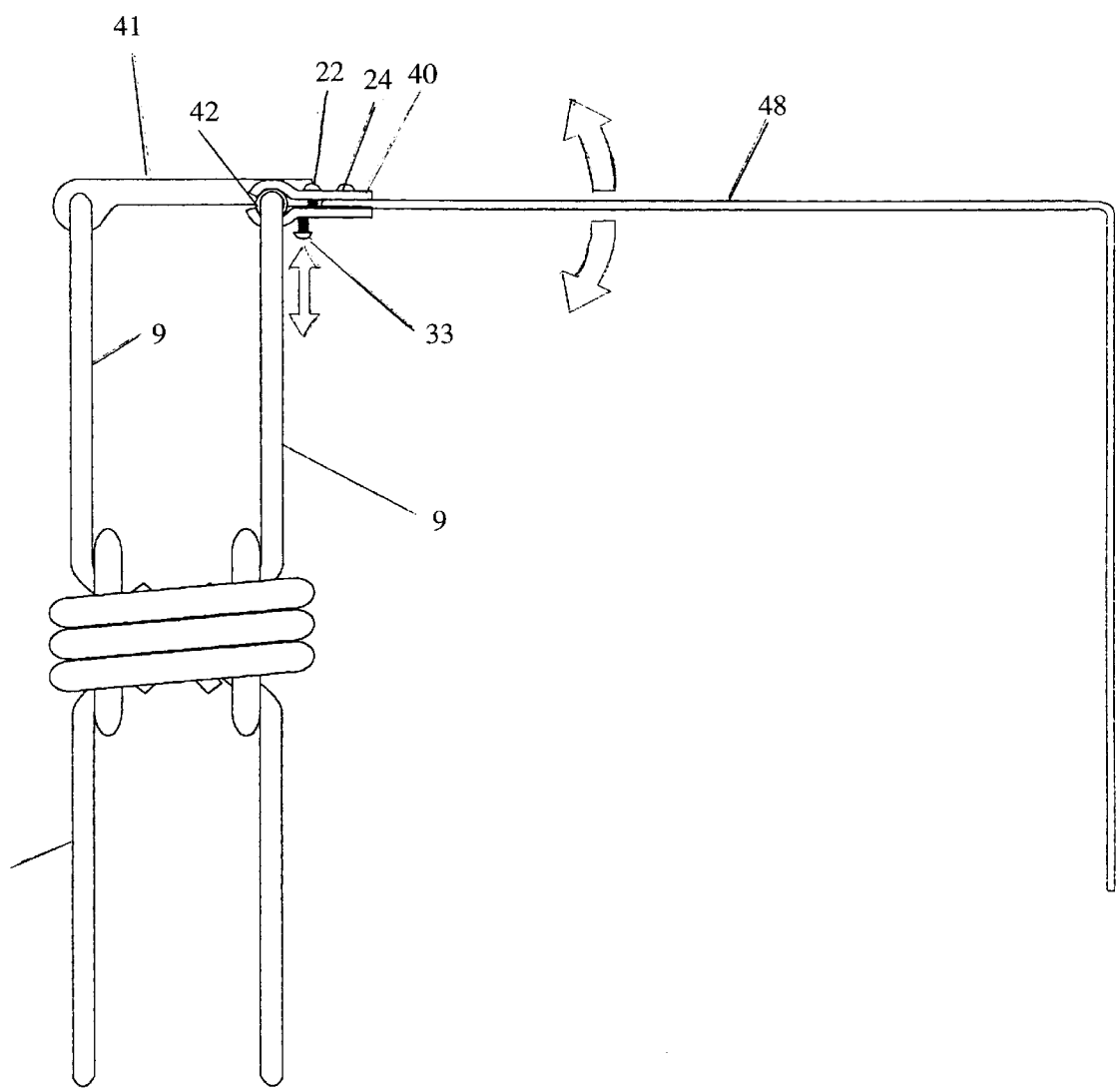
FIG. 4 shows a side view of the adjustable hair-trigger variable tension recessed trigger firing mechanism on a rotating frame trap.
Figure 6:
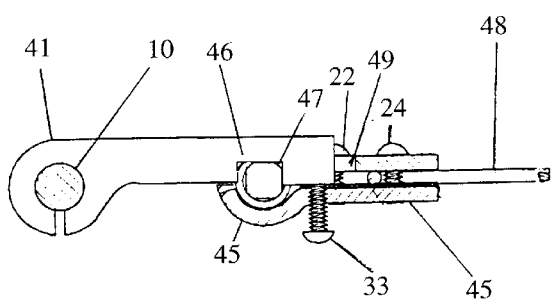
FIG. 6 shows details of an adjustable hair-trigger variable tension recessed trigger firing mechanism with the square notch trap latch on a flat spot or polygon jaw of a rotating frame trap.

FIG. 4 shows a side view of a recessed variable tension hair-trigger firing bracket 40. FIG. 6 shows another view of the recessed variable tension hair-trigger firing bracket 40. In an enclosed situation, this embodiment minimizes dog kills as dogs are initially somewhat reluctant to stick their heads very far into buckets to get at a bait. This gives a dog under the control of its owner a high probablility of not being caught. A hunter out with his dog would probably recognize the trap as such and have a chance to call the dog back before the dog investigated too deeply into the bucket. Field observation has shown when raccoons go into a bucket, they frequently reach in with their paws first. On a prior art trap 1 as shown in FIG. 1, they sometimes pull or push the trigger wire 13 and trigger bracket 12 out of the way and f ire the trap before their head is in the strike zone of the trap 10. This results in a severe blow to the nose, paw, or leg area. It can be a crippling but non-lethal blow because the trap 10 is not a leghold design but a body gripper. The raccoon can pull a leg or nose from the trap and limp away to recuperate or die a slow death. Field observation has shown that there is approximately a 6 to 1 catch to miss ratio. The recessed variable tension hair-trigger bracket 40 of the present embodiment very significantly dog proofs these traps in an enclosed situation. Also, for the most part, it eliminates leg and nose catches of raccoons by having the animal get closer to, and in most cases, into the trap jaws before it can reach the long-bent trigger wire 48 in order to fire the trap 10.

FIG. 6 shows a detailed view of the present alternative embodiment from FIG. 4. It includes a square notch trap latch 41, a recessed variable tension adjustable hair-trigger bracket 40, a polygon wire jaw 46, a no notch bottom bracket half 45, a long notch top bracket half 44, and a long bent trigger wire. 48. It also shows an optional sleeve 42. The material of the sleeve 42, in the preferred embodiment of the present invention should be softer than the jaws 9 of the trap 10, which are normally steel. The sleeve 42 material would normally be brass or a plastic. The purpose of the sleeve 42 is to serve as an alternative to plastic tips on the screw 33, which is to protect the jaws 9 from damage or scoring. The trap jaw 10 and the polygon trap jaw 46 are in the set position. They are restrained from moving away from each other and closing by the flat edge of the square notch 47 of the square notch trap latch 41 meeting against the flat edge of the polygon trap jaw 46. The hair-trigger adjusting screw 33 can raise or allow the square notch trap latch 41 to be lowered upon the polygon trap jaw 46. As the square notch trap latch 41 is raised on the polygon trap jaw 46 by pressure from the hair-trigger adjusting screw 33, it reduces the amount of long bent trigger wire 48 movement necessary to raise the square notch trap latch 41 to a point where the polygon trap jaw 46 is released and the trap 10 is allowed to close by force of the springs 14. Variable tension is provided by the tension adjusting screw 22.

Figure 5:
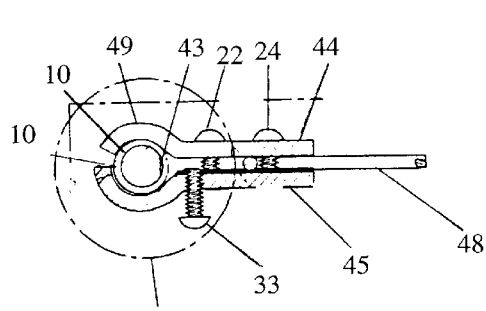
FIGS. 5 and 5A show details of an adjustable hair-trigger variable tension recessed trigger firing mechanism.
Figure 5A:
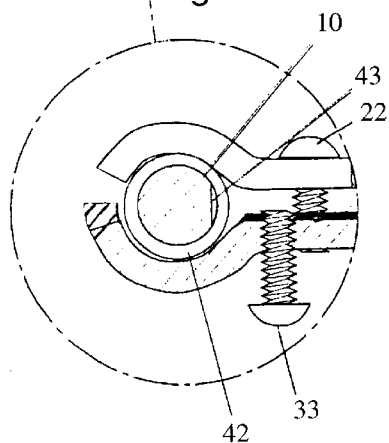
Figure 7:
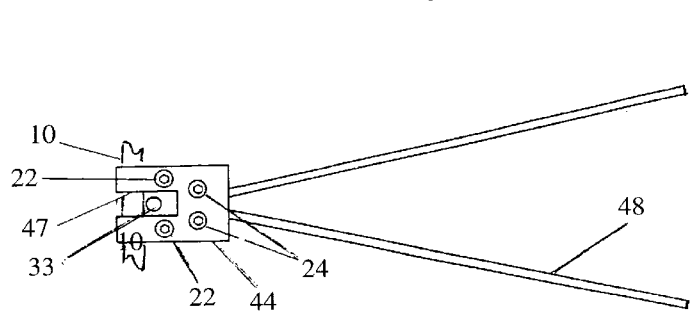
FIG. 7 is a top view of a recessed variable tension adjustable hair-trigger.

FIGS. 5 and 5A show a more detailed side view of the present alternative embodiment. FIG. 7 shows a top view of the same.

FIG. 8 shows a top view of a modificaiton of the recessed variable tension hair-trigger bracket 40, namely a pan attachment 61. The bent portions of the long bent trigger wire 48 are straightened out or clipped off and a broad flat pan is attached to the wire. When a raccoon crawls into the bucket 1 to get the bait 3, the force exerted by the top portion of his body against the pan attachment 61 fires the trap. When placed behind a partial portion of a commonly available snap on cover for the bucket, this will significantly reduce firing by small non-targets and a dogs head even if it went far into the bucket.

Rotating the flaps 180 degrees with the pan attachment on the bottom would make this a step-on activated firing mechanism. There are several pan attachments commercially available for fastening to the trigger wire 13. A search shows no patent for these pan attachments. Regardless, they don't work well at all because the trigger bracket 12 stays vertical and the wires are bent over parallel with the ground. This elevates the trigger wires 13 above the ground, forcing the animal to step up. Without the hair-trigger firing there is a large amount of pan movement before it fires. Also, with anything other than a very small pan the force of gravity frequently fires the trap because of the weight and leverage factor. The variable tension and hair-trigger firing capability of this present embodiments eliminates this warning trigger creep and provides for a short crisp trap firing mechanism that can support the weight of moderate and large sized paws along with the weight of small non-targets.

Figure 9:
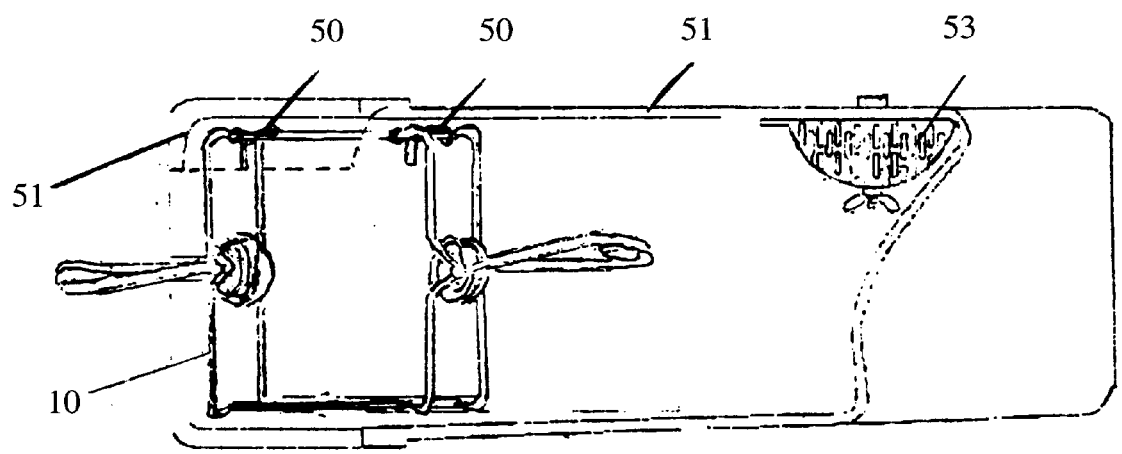
FIG. 9 shows a removable covered square bucket with a rotating frame trap.
Figure 10:
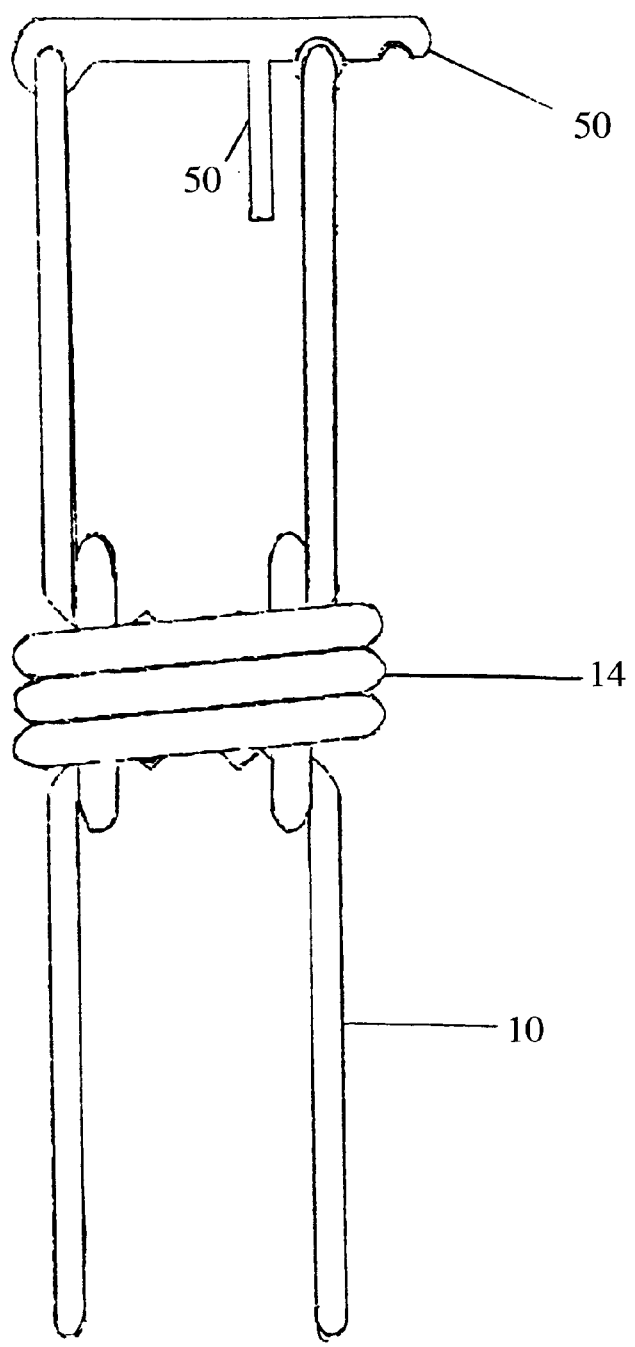
FIG. 10 is a side view of a rotating frame trap with a one-way firing trigger latch.
Figure 11:
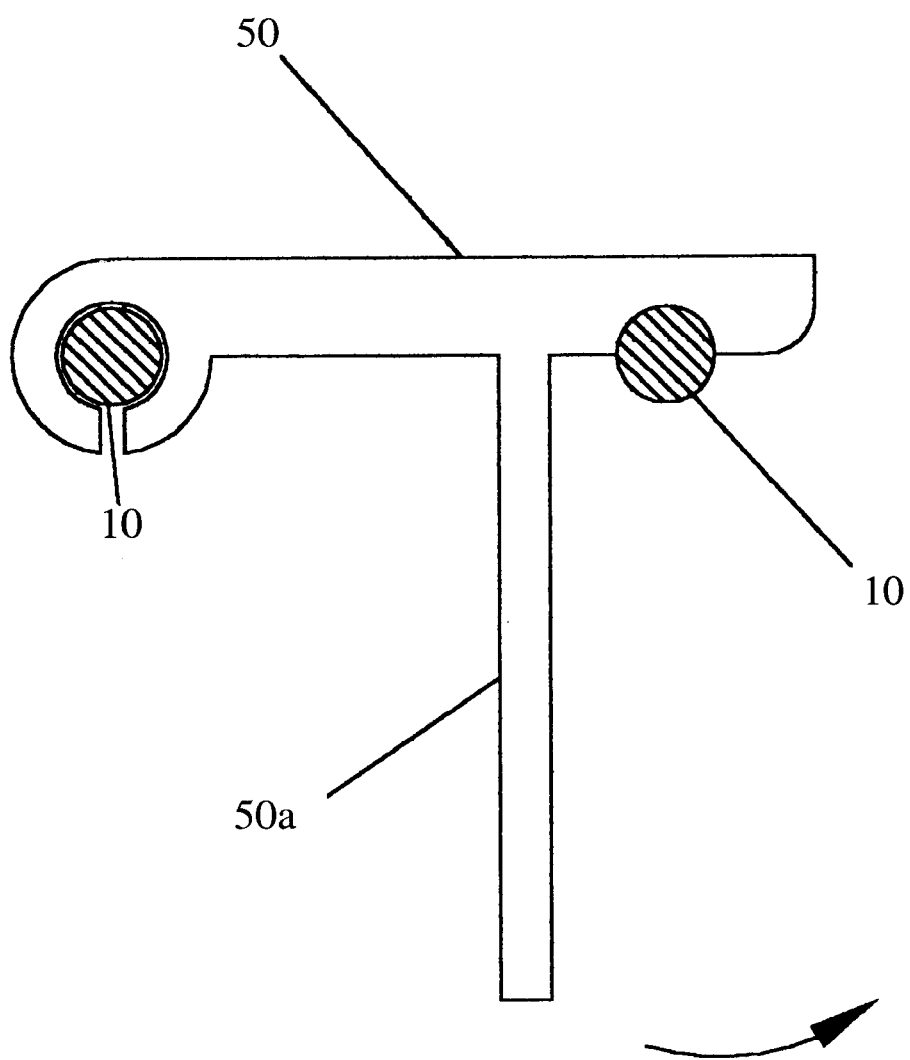
FIG. 11 shows details of a one-way firing trigger latch.

Referring to FIGS. 9, 10, and 11, a target species such as a raccoon has to substantially enter the square bucket 52 in order to get at the bait holder 53. Once the raccoon enters, the only way out is to back out since it is too big to turn around in the square bucket 52. As it entered it did not fire the trap because as its body brushed against a downward protrusion 50a of the tigger latch 50, the trigger latch 50 was forced down against the trap 10. However as the raccoon backs out, the downward protrusion 50a catches in the animal's fat and fur and is moved back and up lifting the trigger latch 50 off of the trap jaw 10 this firing the trap. As dogs are reluctant to stick their heads very far into buckets or holes, a pet dog is less apt to get caught in a trap 10 because if it bumped the trigger latch 50 with its nose on the way in, it might not proceed any further. If it proceeded any further, the taper of its head would more easily allow for it to withdraw without firing the trap. Also, since there is a trigger latch 50 in each upper corner of the trap 10, if the pet dog were to fire one of them, because of the size and taper of its head, it would not fire the other trigger latch 50. As pointed out before, with two triggers, both must be fired to fire the trap 10 as either trigger mechanism in place will hold the jaws 9 of the trap 10 open. Also, the snap-on bucket gaurd cover 51 covers both trigger latches 50. This cover 51 has minimal adverse effect on raccoons entering because raccoons spend their lives crawling through small holes and burrows. The cover 51 makes the hole smaller and should make a pet dog even more reluctant to stick its head into the bucket 52. The bottom edge of the snap-on trigger guard cover 51 would keep a dog's head below the downward protrusion 50a of each trigger latch 50. But a raccoon would still fire the trap.

FIG. 10 shows a side view of a trigger latch 50 on a rotating frame trap 10.

FIG. 11 shows details of a round notch trigger latch 50 which will work on a trap with round jaws.

Figure 12:
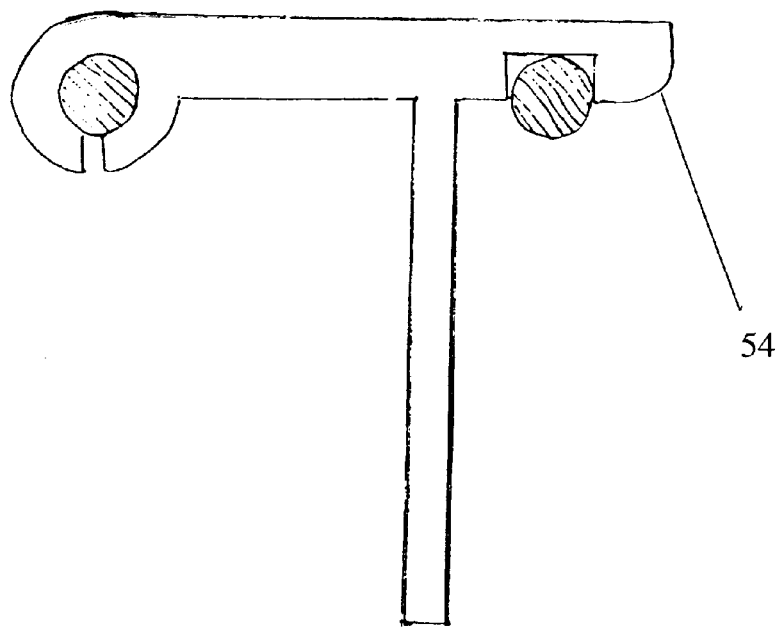
FIG. 12 shows a square notch trap latch.
Figure 13:
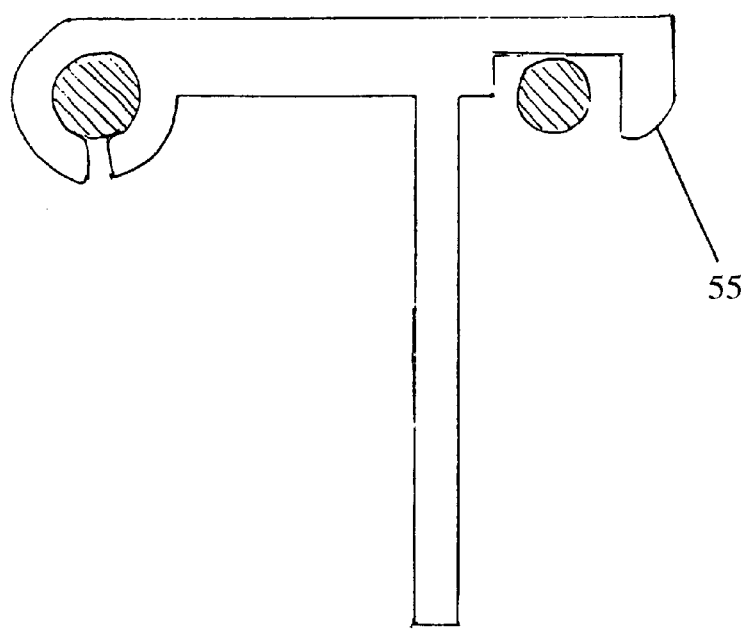
FIG. 13 shows a large square wire trap latch.

FIG. 12 shows a square notch trigger latch 54 and FIG. 13 shows a large square notch trigger latch 55, both of which can work on a round wire jaw trap 10 or a polygon jaw trap 46. The square notch of the large square notch trigger latch 55 is substantially wider and deeper than the square notch of the square notch trap latch 54 which marries closely to the dimmensions of the round jaw 10 or the polygon jaw 46. With a different trigger latch 54, in each upper corner another degree of safety for smaller non-targets and dogs is added. If the large notch trigger latch 55 is raised to a firing position and the trap des not fire because the other latch 54 is not actuated, the large notch trigger latch will fall back into a latching position by gravity. This means that many false firings can occur with one of the two square notch trigger latches 55 and still have the double safety feature working. Also if a dog's nose lifts and fires the square notch trap latch 54, a slight movement of both trap jaws 10, 46 will occur when the latched jaw 46 moves to fill the gap between itself and the edge of the large notch of the large notch trap latch 55. Also a sharp click will be heard. Both occurance should warn a dog. Neither occurence will stop a raccoon from being caught since it is in the trap already and its only way out is to continue to back out.

Although the description above contains many specificities, these should not be constructed as limiting the scope of the invention but merely as providing some of the preferred embodiments of the invention. For example, the hair-trigger adjusting screw 33 is not a necessity for operation of the recessed variable tension hair-trigger firing bracket 40, but the bracket 40 operates more precisely with the screw 33. Also, the sleeve 42 is not necessary for the operation of the recessed variable tension hair-trigger firing bracket 40 when tension adjusting screws 20 are used. However, it is an asset when a radial variable tension screw 32 is used. So, while the present embodiments have been described with particularity, it is understood that the present disclosure has been made only by way of example and that numerous changes in details of construction may be resorted to without departing from the true scope and spirit of the present invention as defined in the approved claims or their legal equivalents.

I claim:
1. A rotating frame animal trap comprising:
   a) a pair of rotating jaws which are rotatable between open and closed positions, each jaw of the pair of jaws having a rectangular frame with an upper, a lower, and parallel sides;
   b) springs attached to the parallel sides of the pair of jaws for biasing the pair of jaws to the closed position;
   c) at least one latch with first and second ends for holding the jaws in the open position when the first end is engaged with the upper side of one of the pair of jaws, said second end of said at least one latch being attached to an upper side of the other one of the pair of jaws;
   d) a bracket with a clamping portion which is clamped on the upper side of the one of the rotating jaws and means for varying the amount of clamp pressure of the clamping portion which comprises a threaded adjuster;
   e) at least one trip wire mounted to said bracket by means for mounting the at least one trip wire, wherein the means for mounting comprises a stop located on a central portion of the bracket and a pair of fasteners located along a lower edge of the bracket opposite the clamping portion of the bracket, wherein an upper portion of the at least one trip wire is supported in a vertical direction by the stop, such that when the trip wire is sufficiently displaced, the bracket displaces the first end of the latch from engaging the upper side of the one of the pair of rotating jaws to thereby allow the pair of jaws to rotate to the closed position; wherein the means for varying the amount of clamp pressure of the clamping portion is located below the clamping portion of the bracket and above both the stop and the pair of fasteners.
2. The rotating frame animal trap of claim 1 wherein the stop is a V shaped stop.

* * * * *